(12) United States Patent
Agarwal

(10) Patent No.: US 11,704,659 B2
(45) Date of Patent: Jul. 18, 2023

(54) COMPUTER-IMPLEMENTED METHOD FOR PERFORMING A RESTRICTED TRANSACTION

(71) Applicant: Visa International Service Association, San Francisco, CA (US)

(72) Inventor: Ved Prakash Sajjan K Agarwal, Dubai (AE)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/484,076

(22) Filed: Sep. 24, 2021

(65) Prior Publication Data
US 2022/0012714 A1 Jan. 13, 2022

Related U.S. Application Data

(63) Continuation of application No. 16/737,201, filed on Jan. 8, 2020, now Pat. No. 11,170,361.

(51) Int. Cl.
*G06Q 20/34* (2012.01)
*G06Q 20/38* (2012.01)
*G06Q 20/20* (2012.01)

(52) U.S. Cl.
CPC ......... *G06Q 20/341* (2013.01); *G06Q 20/204* (2013.01); *G06Q 20/3825* (2013.01)

(58) Field of Classification Search
CPC . G06Q 20/341; G06Q 20/204; G06Q 20/3825
USPC ........................................................ 235/380
See application file for complete search history.

(56) References Cited

U.S. PATENT DOCUMENTS

| | | | |
|---|---|---|---|
| 10,217,099 B1* | 2/2019 | Cheatham | G06Q 20/409 |
| 10,785,022 B2* | 9/2020 | Watanabe | G06F 21/73 |
| 2016/0086186 A1* | 3/2016 | Candelore | G06Q 20/40145 |
| | | | 705/44 |
| 2018/0157949 A1* | 6/2018 | Wennemer | G06Q 20/357 |
| 2019/0188685 A1* | 6/2019 | Gaitanos | G06Q 20/36 |

\* cited by examiner

*Primary Examiner* — Michael G Lee
*Assistant Examiner* — David Tardif
(74) *Attorney, Agent, or Firm* — The Webb Law Firm

(57) ABSTRACT

The present disclosure is related to a field of payment transactions using a card that discloses a computer-implemented method and a system for restricting a transaction while using a payment card. A card processing server may receive card details, a transaction amount, a flag, and signature data of the payment card from a remote terminal upon initiating a transaction using the payment card. Further, the card processing server validates the payment card based on the card details and the signature data of the payment card and thereafter determines a value associated with the flag upon successful validation. The value associated with the flag indicates one of two conditions, e.g., a true condition and a false condition. Based on the condition indicated by the flag, the card processing server performs one of a first action and a second action related to either processing or declining the transaction.

19 Claims, 6 Drawing Sheets

COMPUTER-IMPLEMENTED METHOD FOR PERFORMING A RESTRICTED TRANSACTION

CROSS-REFERENCE TO RELATED APPLICATION

This application is a continuation of U.S. patent application Ser. No. 16/737,201 filed on Jan. 8, 2020, the disclosure of which is hereby incorporated by reference in its entirety.

BACKGROUND

1. Technical Field

The present disclosure relates to payment transactions using a card. Particularly, but not exclusively, the present disclosure relates to a computer-implemented method for performing a restricted transaction when using a payment card.

2. Technical Considerations

In today's markets, a large segment of the population chooses to perform cashless transactions by using payment cards, such as a debit card or a credit card. However, such card-present transactions may involve a risk factor. In some countries, the payment cards may not require a security pin to process the transaction when communicatively interfaced with card accepting devices. Therefore, when a user misplaces or loses their payment card, a third party who finds the payment card may easily perform a fraudulent transaction of a large amount. Further, when the payment cards are used in public places, such as restaurants, movie theatres, and the like, there is ample time for a third party to skim the payment card without the notice of the user by either swiping the payment card through a card skimming device, by capturing photos of the payment card, or by recording necessary card details, such as card number, Card Verification Value (CVV), expiry date, name on the card, and the like, which may be necessary to perform a fraudulent transaction.

Therefore, though the cashless transactions are more convenient, performing the cashless transactions using conventional payment cards are always associated with security risk. The existing techniques provide secure ways of performing a transaction, by using encrypting/decrypting techniques, hashing techniques, and the like, to secure the card details and security pin provided by the user, while this data is being transmitted from a card accepting device to a card processing server. While these techniques securely transmit the data to the card processing servers, they fail to address the problem of card skimming. Further, the existing techniques provide a mechanism of informing the concerned bank and blocking the payment card when the user misplaces or loses their payment card. However, if the user does not notice the loss of the payment card for many hours after losing the payment card, the fraudulent users can perform fraudulent transactions of large amounts before the genuine user can notice and reach the concerned bank to block the payment card. Therefore, the existing techniques fail to provide a mechanism to stop fraudulent transactions of large amounts, before the genuine user blocks the payment card.

Therefore, currently, there exists a need for providing a secure mechanism to address one or more challenges described above.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method comprising: receiving, by a card processing server, card details, a transaction amount, a flag, and signature data of a payment card from a remote terminal communicatively interfaced with the payment card for initiating a transaction; validating, by the card processing server, the payment card based on the card details and the signature data of the payment card; determining, by the card processing server, a value associated with the flag received from the remote terminal upon successful validation, wherein the value associated with the flag indicates one of two conditions; and performing, by the card processing server, one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

In some non-limiting embodiments or aspects, the signature data comprises at least one of a first signature associated with a primary chip of the payment card and a second signature associated with a secondary chip of the payment card. In some non-limiting embodiments or aspects, validating the payment card comprises relating a first signature associated with a primary chip of the payment card and a second signature associated with a secondary chip of the payment card to detect a match.

In some non-limiting embodiments or aspects, the computer-implemented method further comprises determining, by the card processing server, an attachment or a detachment of a first portion of the payment card and a second portion of the payment card based on the value associated with the flag received from the remote terminal, wherein the first portion of the payment card is configured with a primary chip and the second portion of the payment card is configured with a secondary chip. In some non-limiting embodiments or aspects, the attachment is determined when the value associated with the flag indicates a true condition, wherein the value is set to indicate the true condition when signature data received at the remote terminal comprises a first signature associated with the primary chip and a second signature associated with the secondary chip. In some non-limiting embodiments or aspects, the detachment is determined when the value associated with the flag indicates a false condition, wherein the value is set to indicate the false condition when signature data received at the remote terminal comprises one of a first signature associated with the primary chip or a second signature associated with the secondary chip.

In some non-limiting embodiments or aspects, provided is a card processing server comprising: at least one processor; and a memory communicatively coupled to the processor, wherein the memory stores processor-executable instructions, which, on execution, causes the at least one processor to: receive card details, a transaction amount, a flag, and signature data of a payment card from a remote terminal communicatively interfaced with a payment card for initiating a transaction; validate the payment card based on the card details and the signature data of the payment card;

determine a value associated with the flag received from the remote terminal upon successful validation, wherein the value associated with the flag indicates one of two conditions; and perform one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

In some non-limiting embodiments or aspects, the signature data comprises at least one of a first signature associated with a primary chip of the payment card and a second signature associated with a secondary chip of the payment card. In some non-limiting embodiments or aspects, the processor validates the payment card by relating a first signature associated with a primary chip of the payment card and a second signature associated with a secondary chip of the payment card to detect a match.

In some non-limiting embodiments or aspects, the processor is further configured to detect an attachment or a detachment of a first portion of the payment card and a second portion of the payment card based on the value associated with the flag received from the remote terminal, wherein the first portion of the payment card is configured with a primary chip and the second portion of the payment card is configured with a secondary chip. In some non-limiting embodiments or aspects, the processor determines the attachment when the value associated with the flag indicates a true condition, wherein the value is set to indicate the true condition when signature data received at the remote terminal comprises a first signature associated with the primary chip and a second signature associated with the secondary chip. In some non-limiting embodiments or aspects, the processor determines the detachment when the value associated with the flag indicates a false condition, wherein the value is set to indicate the false condition when signature data received at the remote terminal comprises one of a first signature associated with the primary chip or a second signature associated with the secondary chip.

In some non-limiting embodiments or aspects, provided is a payment card comprising: a first portion with a primary chip; a second portion with a secondary chip; a mechanism capable of detachably connecting the first portion and the second portion; and a physical communication link configured between the primary chip and the secondary chip to communicatively connect the first portion and the second portion of the payment card, wherein the physical communication link facilitates a determination whether the first portion is physically intact with the second portion.

In some non-limiting embodiments or aspects, the primary chip is associated with a first signature and the secondary chip is associated with a second signature. In some non-limiting embodiments or aspects, the first signature and the second signature facilitate authentication of a first portion and a second portion of the payment card when the first portion and the second portion are physically intact. In some non-limiting embodiments or aspects, the physical communication link is further configured to transmit signature data from the primary chip and the secondary chip to a remote terminal when the payment card is interfaced with the remote terminal, wherein the signature data comprises at least one of a first signature and a second signature. In some non-limiting embodiments or aspects, the mechanism is a magnetic link.

In some non-limiting embodiments or aspects, provided is a system comprising: a payment card; a remote terminal; and a card processing server; wherein the remote terminal is configured to: retrieve card details from the payment card communicatively interfaced with the remote terminal; receive signature data from at least one of a primary chip of the payment card and a secondary chip of the payment card; set a value of a flag to indicate a true condition, when the signature data is received from the primary chip and the secondary chip, or a value of the flag to indicate a false condition, when the signature data is received from one of the primary chip or the secondary chip; and transmit the card details, the signature data, the flag, and a transaction amount to the card processing server associated with the remote terminal for initiating a transaction; and receive an acknowledgement related to at least one of completion of the transaction or denial of the transaction from the card processing server; and wherein the card processing server is configured to: receive the card details, the transaction amount, the flag, and the signature data of the payment card from the remote terminal; validate the payment card based on the card details and the signature data of the payment card; determine the value associated with the flag received from the remote terminal upon successful validation, wherein the value associated with the flag indicates one of two conditions; and perform one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

In some non-limiting embodiments or aspects, the primary chip is configured in a first portion of the payment card and the secondary chip is configured in a second portion of the payment card, wherein the first portion and the second portion form a unique pair that are detachable and communicatively connectable. In some non-limiting embodiments or aspects, the first portion of the payment card comprising the primary chip is communicatively interfaced with a remote terminal for initiating a transaction, wherein the first portion of the payment card is attached or detached from the second portion of the payment card while initiating the transaction.

In some non-limiting embodiments or aspects, the signature data comprises at least one of a first signature associated with the primary chip and a second signature associated with the secondary chip. In some non-limiting embodiments or aspects, the card processing server validates the payment card by relating a first signature associated with the primary chip and a second signature associated with the secondary chip to detect a match.

In some non-limiting embodiments or aspects, the card processing server is further configured to detect an attachment or a detachment of a first portion of the payment card and a second portion of the payment card based on the value associated with the flag. In some non-limiting embodiments or aspects, the card processing server determines the attachment when the value associated with the flag indicates a true condition. In some non-limiting embodiments or aspects, the card processing server determines the detachment when the value associated with the flag indicates a false condition.

Further non-limiting embodiments or aspects are set forth in the following numbered clauses.

Clause 1: A computer-implemented method comprising: receiving, by a card processing server, card details, a transaction amount, a flag, and signature data of a payment card from a remote terminal communicatively interfaced with the payment card for initiating a transaction; validating, by the card processing server, the payment card based on the card details and the signature data of the payment card; determining, by the card processing server, a value associated with the flag received from the remote terminal upon successful validation, wherein the value associated with the flag indicates one of two conditions; and performing, by the card processing server, one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

Clause 2: The computer-implemented method of clause 1, wherein the signature data comprises at least one of a first signature associated with a primary chip of the payment card and a second signature associated with a secondary chip of the payment card.

Clause 3: The computer-implemented method of clause 1 or 2, wherein validating the payment card comprises relating a first signature associated with a primary chip of the payment card and a second signature associated with a secondary chip of the payment card to detect a match.

Clause 4: The computer-implemented method of any of clauses 1-3, further comprising determining, by the card processing server, an attachment or a detachment of a first portion of the payment card and a second portion of the payment card based on the value associated with the flag received from the remote terminal, wherein the first portion of the payment card is configured with a primary chip and the second portion of the payment card is configured with a secondary chip.

Clause 5: The computer-implemented method of any of clauses 1-4, wherein the attachment is determined when the value associated with the flag indicates a true condition, wherein the value is set to indicate the true condition when signature data received at the remote terminal comprises a first signature associated with the primary chip and a second signature associated with the secondary chip.

Clause 6: The computer-implemented method of any of clauses 1-5, wherein the detachment is determined when the value associated with the flag indicates a false condition, wherein the value is set to indicate the false condition when signature data received at the remote terminal comprises one of a first signature associated with the primary chip or a second signature associated with the secondary chip.

Clause 7: A card processing server comprising: at least one processor; and a memory communicatively coupled to the processor, wherein the memory stores processor-executable instructions, which, on execution, causes the at least one processor to: receive card details, a transaction amount, a flag, and signature data of a payment card from a remote terminal communicatively interfaced with a payment card for initiating a transaction; validate the payment card based on the card details and the signature data of the payment card; determine a value associated with the flag received from the remote terminal upon successful validation, wherein the value associated with the flag indicates one of two conditions; and perform one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

Clause 8: The card processing server of clause 7, wherein the signature data comprises at least one of a first signature associated with a primary chip of the payment card and a second signature associated with a secondary chip of the payment card.

Clause 9: The card processing server of clause 7 or 8, wherein the processor validates the payment card by relating a first signature associated with a primary chip of the payment card and a second signature associated with a secondary chip of the payment card to detect a match.

Clause 10: The card processing server of any of clauses 7-9, wherein the processor is further configured to detect an attachment or a detachment of a first portion of the payment card and a second portion of the payment card based on the value associated with the flag received from the remote terminal, wherein the first portion of the payment card is configured with a primary chip and the second portion of the payment card is configured with a secondary chip.

Clause 11: The card processing server of any of clauses 7-10, wherein the processor determines the attachment when the value associated with the flag indicates a true condition, wherein the value is set to indicate the true condition when the signature data received at the remote terminal comprises a first signature associated with the primary chip and a second signature associated with the secondary chip.

Clause 12: The card processing server of any of clauses 7-11, wherein the processor determines the detachment when the value associated with the flag indicates a false condition, wherein the value is set to indicate the false condition when signature data received at the remote terminal comprises one of a first signature associated with the primary chip or a second signature associated with the secondary chip.

Clause 13: A payment card comprising: a first portion with a primary chip; a second portion with a secondary chip; a mechanism capable of detachably connecting the first portion and the second portion; and a physical communication link configured between the primary chip and the secondary chip to communicatively connect the first portion and the second portion of the payment card, wherein the physical communication link facilitates a determination whether the first portion is physically intact with the second portion.

Clause 14: The payment card of clause 13, wherein the primary chip is associated with a first signature and the secondary chip is associated with a second signature.

Clause 15: The payment card of clause 13 or 14, wherein the first signature and the second signature facilitate authentication of the first portion and the second portion of the payment card when the first portion and the second portion are physically intact.

Clause 16: The payment card of any of clauses 13-15, wherein the physical communication link is further configured to transmit signature data from the primary chip and the secondary chip to a remote terminal when the payment card is interfaced with the remote terminal, wherein the signature data comprises at least one of a first signature and a second signature.

Clause 17: The payment card of any of clauses 13-16, wherein the mechanism is a magnetic link.

Clause 18: A system comprising: a payment card; a remote terminal; and a card processing server, wherein the remote terminal is configured to: retrieve card details from the payment card communicatively interfaced with the remote terminal; receive signature data from at least one of a primary chip of the payment card and a secondary chip of the payment card; set a value of a flag to indicate a true condition, when the signature data is received from the primary chip and the secondary chip, or a value of the flag to indicate a false condition, when the signature data is received from one of the primary chip or the secondary chip; and transmit the card details, the signature data, the flag, and a transaction amount to the card processing server associated with the remote terminal for initiating a transaction; and receive an acknowledgement related to at least one of completion of the transaction or denial of the transaction from the card processing server, and wherein the card processing server is configured to: receive the card details, the transaction amount, the flag, and the signature data of the payment card from the remote terminal; validate the payment card based on the card details and the signature data of the payment card; determine the value associated with the flag received from the remote terminal upon successful validation, wherein the value associated with the flag indicates one of two conditions; and perform one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

Clause 19: The system of clause 18, wherein the primary chip is configured in a first portion of the payment card and the secondary chip is configured in a second portion of the payment card, and wherein the first portion of the payment cared and the second portion of the payment card form a unique pair that are detachable and communicatively connectable.

Clause 20: The system of clause 18 or 19, wherein the first portion of the payment card comprising the primary chip is communicatively interfaced with a remote terminal for initiating a transaction, and wherein the first portion of the payment card is attached or detached from the second portion of the payment card while initiating the transaction.

Clause 21: The system of any of clauses 18-20, wherein the signature data comprises at least one of a first signature associated with the primary chip and a second signature associated with the secondary chip.

Clause 22: The system of any of clauses 18-21, wherein the card processing server validates the payment card by relating a first signature associated with the primary chip and a second signature associated with the secondary chip to detect a match.

Clause 23: The system of any of clauses 18-22, wherein the card processing server is further configured to detect an attachment or a detachment of a first portion of the payment card and a second portion of the payment card based on the value associated with the flag.

Clause 24: The system of any of clauses 18-23, wherein the card processing server determines the attachment when the value associated with the flag indicates a true condition.

Clause 25: The system of any of clauses 18-24, wherein the card processing server determines the detachment when the value associated with the flag indicates a false condition.

Disclosed herein is a computer-implemented method that may include receiving, by a card processing server, card details, a transaction amount, a flag, and signature data of the payment card from a remote terminal associated with the card processing server. The remote terminal is communicatively interfaced with a payment card for initiating a transaction. Further, the method includes validating the payment card based on the card details and the signature data of the payment card. Subsequently, the method includes determining a value associated with the flag received from the remote terminal upon successful validation. The value associated with the flag indicates one of two conditions. Upon determining the value associated with the flag, the method includes performing one of a first action and a second action based on the condition indicated by the flag. The first action comprises processing the transaction when the transaction amount is determined to be less than a predefined transaction limit and declining the transaction when the transaction amount is determined to be more than the predefined transaction limit. The second action comprises processing the transaction.

Further, in some non-limiting embodiments or aspects, the present disclosure may include a card processing server. The card processing server includes a processor and a memory communicatively coupled to the processor. The memory stores the processor instructions, which, on execution, causes the processor to receive a flag and signature data of the payment card from a remote terminal associated with the card processing server. The remote terminal is communicatively interfaced with a payment card for initiating a transaction. Further, the processor is configured to validate the payment card based on the card details and the signature data of the payment card. Subsequently, the processor is configured to determine a value associated with the flag received from the remote terminal upon successful validation. The value associated with the flag indicates one of two conditions. Upon determining the value associated with the flag, the processor performs one of a first action and a second action based on the condition indicated by the flag. The first action comprises processing the transaction when the transaction amount is determined to be less than a predefined transaction limit and declining the transaction when the transaction amount is determined to be more than the predefined transaction limit. The second action comprises processing the transaction.

Further, in some non-limiting embodiments or aspects, the present disclosure may include a payment card comprising a first portion with a primary chip, a second portion with a secondary chip, a mechanism, and a physical communication link. The mechanism is capable of detachably connecting the first portion and the second portion. Further, the physical communication link is configured between the primary chip and the secondary chip to communicatively connect the first portion and the second portion of the payment card. The physical communication link facilitates to determine whether the first portion is physically intact with the second portion.

Furthermore, in some non-limiting embodiments or aspects, the present disclosure may include a system comprising a payment card, a remote terminal, and a card processing server. The remote terminal is configured to retrieve card details from the payment card communicatively interfaced with the remote terminal. Further, the remote terminal is configured to receive signature data from at least one of a primary chip of the payment card and a secondary chip of the payment card. Subsequently, the remote terminal is configured to set a value of a flag to indicate a true condition, when the signature data is received from the primary chip and the secondary chip, or a value of the flag to indicate a false condition, when the signature data is received from one of the primary chip or the secondary chip. Upon setting the value of the flag, the remote terminal is configured to transmit the card details, the signature data, the flag, and a transaction amount to the card processing server associated with the remote terminal for initiating a transaction. Further, the remote terminal is configured to receive an acknowledgement related to at least one of completion of the transaction or denial of the transaction from the card processing server. The card processing server is configured to receive the card details, the transaction amount, the flag, and the signature data of the payment card from the remote terminal. Further, the card processing server is configured to validate the payment card based on the card details and the signature data of the payment card. Upon validating the payment card, the card processing server is configured to determine the value associated with the flag received from the remote terminal upon successful validation. The value associated with the flag indicates one of two conditions. Upon determining the value associated with the flag, the card processing server is configured to perform one of a first action and a second action based on the condition indicated by the flag. The first action comprises processing the transaction when the transaction amount is determined to be less than a predefined transaction limit and declining the transaction when the transaction amount is determined to be more than the predefined transaction limit. The second action comprises processing the transaction.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1A:
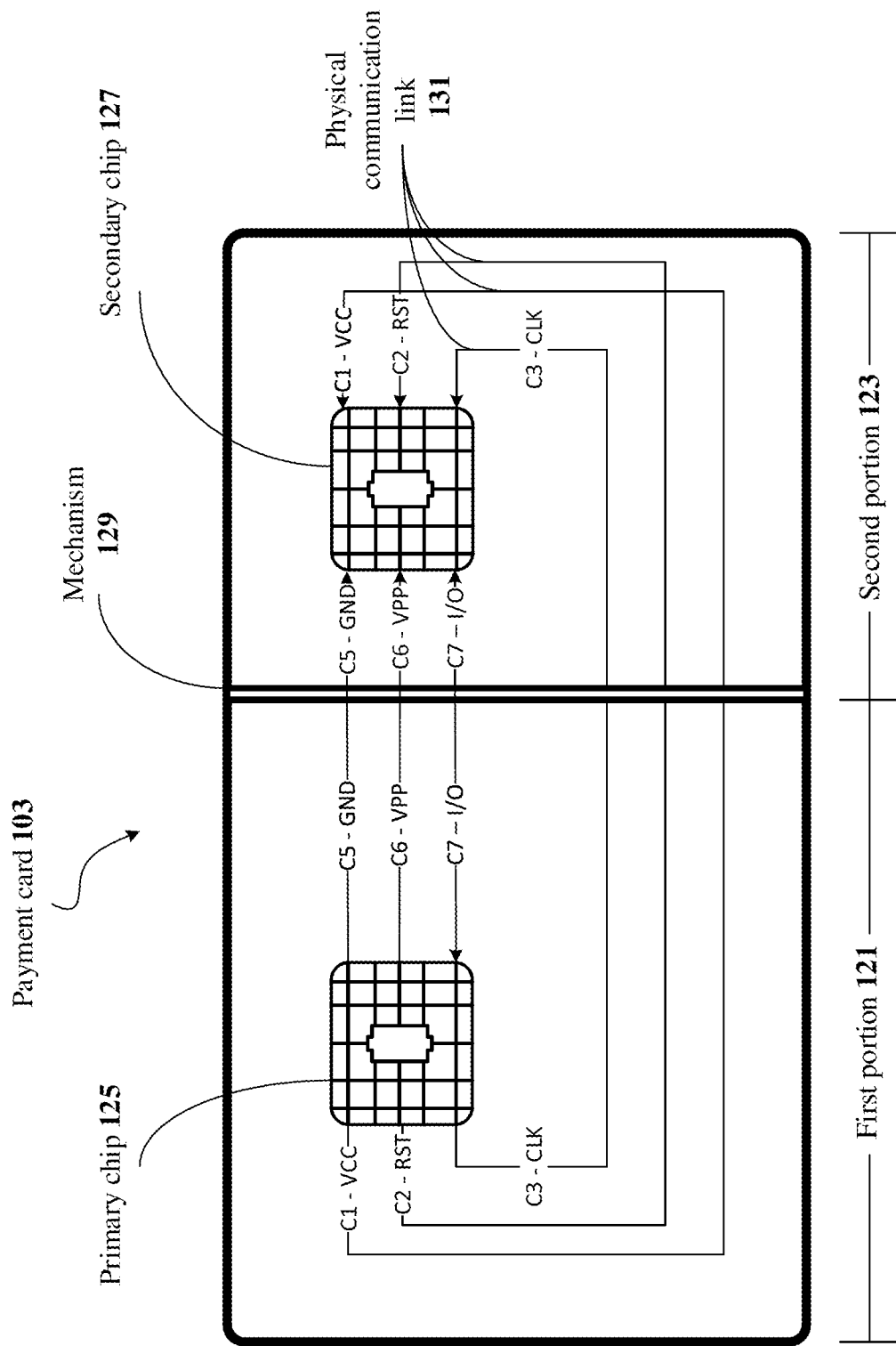
FIGS. 1A and 1B show structure and working of a payment card, in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but is not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a computer-implemented method, a payment card and a system for performing a restricted transaction. In some non-limiting embodiments or aspects, the system comprises the payment card, a remote terminal, and a card processing server. The remote terminal may retrieve card details from the payment card when the payment card is communicatively interfaced with the remote terminal. Further, the remote terminal may receive signature data from at least one of a primary chip of the payment card and a secondary chip of the payment card, based on which the remote terminal may set a value of a flag to either a true condition or a false condition. Upon setting the value of the flag, the remote terminal may transmit the card details, the signature data, the flag, and a transaction amount to the card processing server associated with the remote terminal for initiating a transaction. Further, the card processing server may validate the payment card based on the card details and the signature data of the payment card received from the remote terminal. If the validation of the payment card is successful, the card processing server may proceed and determine the value associated with the flag received from the remote terminal. Upon determining the value associated with the flag, the card processing server may perform one of a first action and a second action based on a condition indicated by the flag. In some non-limiting embodiments or aspects, when the condition indicated by the flag is a false condition, the card processing server may perform the first action. The first action may involve processing the transaction when the transaction amount is determined to be less than a predefined transaction limit. On the other hand, when the transaction amount is determined to be more than the predefined transaction limit, the first action may involve declining the transaction. In some non-limiting embodiments or aspects, when the condition indicated by the flag is a true condition, the card processing server may perform the second action. The second action may involve processing the transaction. In some non-limiting embodiments or aspects, upon completion of at least one of the first action or the second action, the card processing server may transmit a corresponding acknowledgement to the remote terminal.

The present disclosure enables a user of the payment card to restrict the transaction as per their requirement. The payment card used in the present disclosure comprises a first portion and a second portion that are detachable (explained in detail in the further part of the specification). The value associated with the flag indicates to the card processing server whether both the first portion and the second portion of the card are present at the time of initiating the transaction or whether only the first portion or the second portion is present at the time of initiating the transaction. The present disclosure allows the user to have a single card that can be used for both normal usage without restriction and for a restricted transaction by choosing to keep the first portion and the second portion of the payment card either attached or detached at the time of initiating a transaction.

As an example where a parent hands over a payment card to his child, but does not want the child to overspend, the parent can preconfigure a transaction limit, for example, $500. Therefore, when handing over the payment card to the child, the parent detaches the second portion of the payment card and provides only the first portion, which indicates to the card processing server at the time of transaction that this transaction should be restricted based on the preconfigured transaction limit. Therefore, the card processing server may not allow any transaction of the child that would exceed the preconfigured amount, though there are sufficient funds available in a bank account associated with the payment card. Further, the present disclosure provides enhanced transaction security to the users, e.g., eliminating the possibility of illegitimate transaction attempts that could be performed by third parties through card skimming techniques. As an example, consider a scenario where the user is in a restaurant and provides the payment card for initiating a transaction. In the absence of wireless remote terminals, the payment card of the user may be taken to the payment counter, where the payment card may be swiped through a card skimmer to extract the details of the payment card, without the notice of the user. The present disclosure eliminates such possibility of card skimming since the payment card disclosed herein comprises detachable portions. Therefore, when the user provides only the first portion of the payment card for initiating the transaction, card details of the payment card such as Card Verification Value (CVV), card number, and the like may not be present or may be incomplete on the first portion of the payment card, thus securing the details of the payment card.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1B:
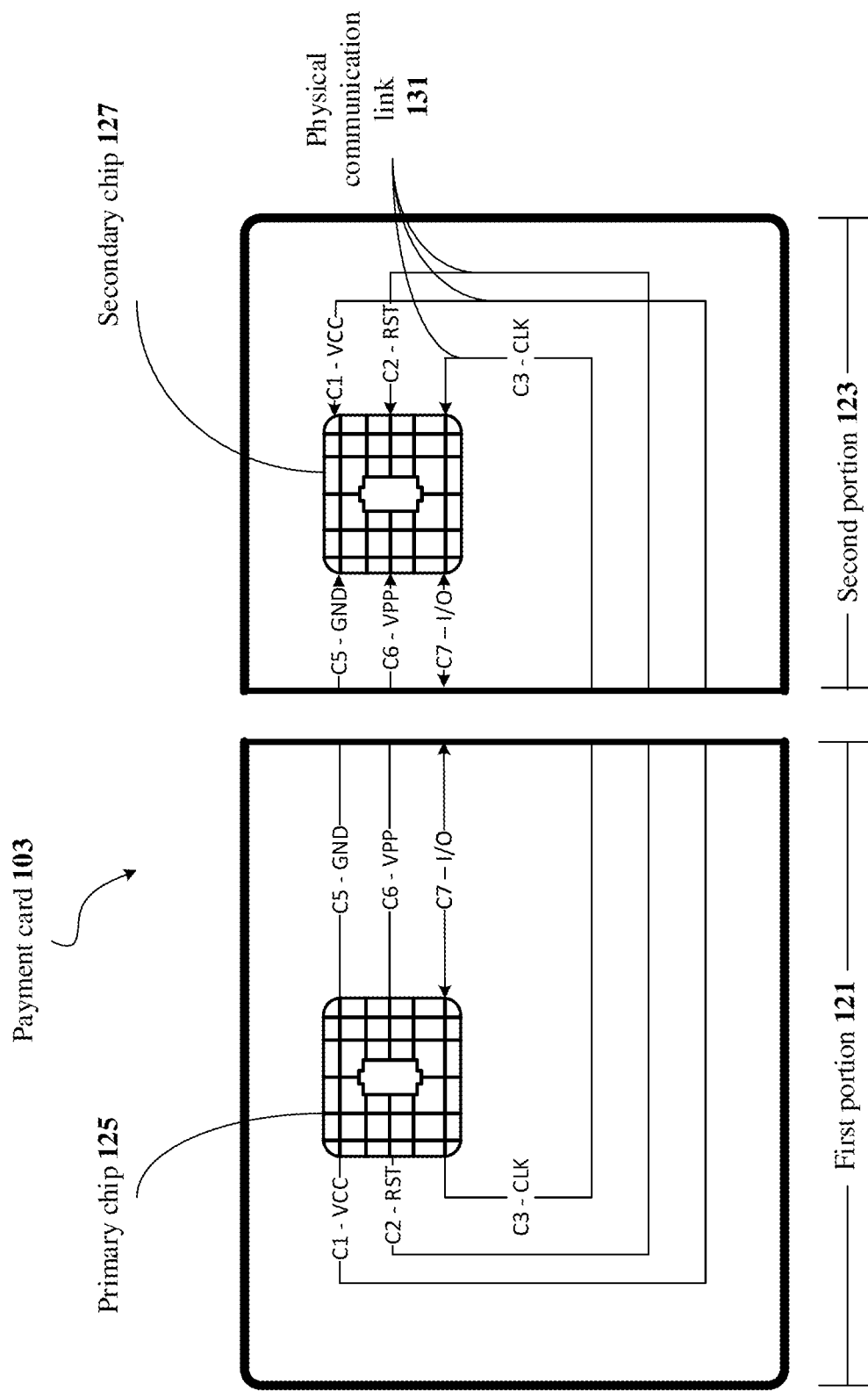

FIGS. 1A and 1B show structure and working of a payment card 103 in accordance with some non-limiting embodiments or aspects of the present disclosure. In some implementations, the payment card 103 may be a debit card or a credit card, which is used for performing a transaction. The payment card 103 may include, but is not limited to, a first portion 121, a second portion 123, a primary chip 125, a secondary chip 127, a mechanism 129, and a physical communication link 131. In some non-limiting embodiments or aspects, the first portion 121 of the payment card 103 may be detachably connected to the second portion 123 of the payment card 103, externally, via the mechanism 129 as shown in FIG. 1A. As an example, the mechanism 129 may be a magnetic link that enables attachment and detachment of the first portion 121 and the second portion 123 of the payment card 103. In some non-limiting embodiments or aspects, any other type of mechanism 129 capable of detachably connecting the first portion 121 and the second portion 123 may also be used apart from the magnetic link. Further, in some non-limiting embodiments or aspects, the physical communication link 131 is configured between the primary chip 125 and the secondary chip 127 of the payment card 103. As an example, the physical communication link 131 may include, but is not limited to, a circuit. The physical communication link 131 may communicatively connect the first portion 121 and the second portion 123 of the payment card. In some non-limiting embodiments or aspects, the physical communication link 131 facilitates a determination of whether the first portion 121 is physically intact with the second portion 123. In some non-limiting embodiments or aspects, the physical communication link 131 may be embedded within the payment card 103 as shown in FIG. 1A.

In some non-limiting embodiments or aspects, the primary chip 125 may be configured in the first portion 121 of the payment card 103 and the secondary chip 127 may be configured in the second portion 123 of the payment card 103. The present disclosure is explained considering the arrangement of the primary chip 125 and the secondary chip 127 as mentioned in the above embodiment. However, this should not be considered as a limitation of the present disclosure as the arrangement of the primary chip 125 and the secondary chip 127 could be different. As an example, the primary chip 125 may be alternatively configured in the second portion 123 of the payment card 103 and the secondary chip 127 may be configured in the first portion 121 of the payment card 103.

As shown in FIG. 1A, pins C1-VCC, C2-RST, C3-CLK, C5-GND, C6-VPP, and C7-I/O of the primary chip 125 may be connected to the corresponding pins of the secondary chip 127. When the payment card 103 is communicatively interfaced with a remote terminal 105 (FIG. 1C), the primary chip 125 is generally in contact with the remote terminal 105. As an example, the remote terminal 105 may be a card accepting device which initiates a transaction. The first portion 121 may be powered due to pin C1-VCC, when the payment card 103 is communicatively interfaced with a remote terminal 105. Further, if the first portion 121 and the second portion 123 of the payment card 103 are in an attached state, e.g., attached through the mechanism 129, the second portion 123 of the payment card 103 may also be activated due to the physical communication link 131. When both the first portion 121 and the second portion 123 of the payment card 103 are connected via the mechanism 129 and powered via pin C1-VCC, the remote terminal 105 may receive corresponding signature data from both the primary chip 125 and the secondary chip 127 of the payment card 103. However, when the first portion 121 and the second portion 123 of the payment card 103 are not connected via the mechanism 129, the physical communication link 131 may be broken as shown in FIG. 1B. In some non-limiting embodiments or aspects, if the first portion 121 and the second portion 123 of the payment card 103 are in a detached state, e.g., not attached through the mechanism 129, the first portion 121 of the payment card 103 may not have any communication with the secondary chip 127 of the second portion 123. As a result, only the first portion 121 of the payment card 103 may be powered through the pin C1-VCC of the primary chip 125. Since the physical communication link 131 is broken in the detached state, the power does not pass to the secondary chip 127 as observed in the attached state. Therefore, in the detached state, the remote terminal 105 may receive the signature data only from the primary chip 125 configured in the first portion 121 of the payment card 103.

In some non-limiting embodiments or aspects, the primary chip 125 of the payment card 103 may be associated with a first signature and the secondary chip 127 of the payment card 103 may be associated with a second signature. Therefore, the signature data received from the primary chip 125 may include, but is not limited to, the first signature, and the signature data received from the secondary chip 127 may include, but is not limited to, the second signature. In some non-limiting embodiments or aspects, the first signature and the second signature facilitate to authenticate the identity of the first portion 121 and the second portion 123 when the first portion 121 and the second portion 123 are physically intact. As an example, authenticating the identity may include verifying the first signature and the second signature to authenticate whether the attached first portion 121 and the second portion 123 are valid portions of a single payment card 103. In some non-limiting embodiments or aspects, the primary chip 125 may be configured to interact with the remote terminal 105 and initiate the transaction when the payment card 103 is communicatively interfaced with the remote terminal 105. Further, the secondary chip 127 may be configured to ensure security during the transactions, e.g., ensuring whether the second portion 123 of the payment card 103 attached to the first portion 121 of the payment card 103 is a valid portion. In some non-limiting embodiments or aspects, the secondary chip 127 may also be used to detect whether the first portion 121 and the second portion 123 of the payment card 103 are in the attached state or the detached state.

In some non-limiting embodiments or aspects, a user of the payment card 103 may pre-configure one or more restrictions on the payment card 103 as per their requirement. As an example, the user may restrict a transaction by pre-configuring a transaction limit to "X" amount when the second portion 123 is determined to be detached from the first portion 121 of the payment card 103 during the transaction. In another example, the user may restrict a transaction related to certain products by pre-configuring a corresponding Merchant Category Code, when the second portion 123 is determined to be detached from the first portion 121 of the payment card 103 during the transaction.

Figure 1C:
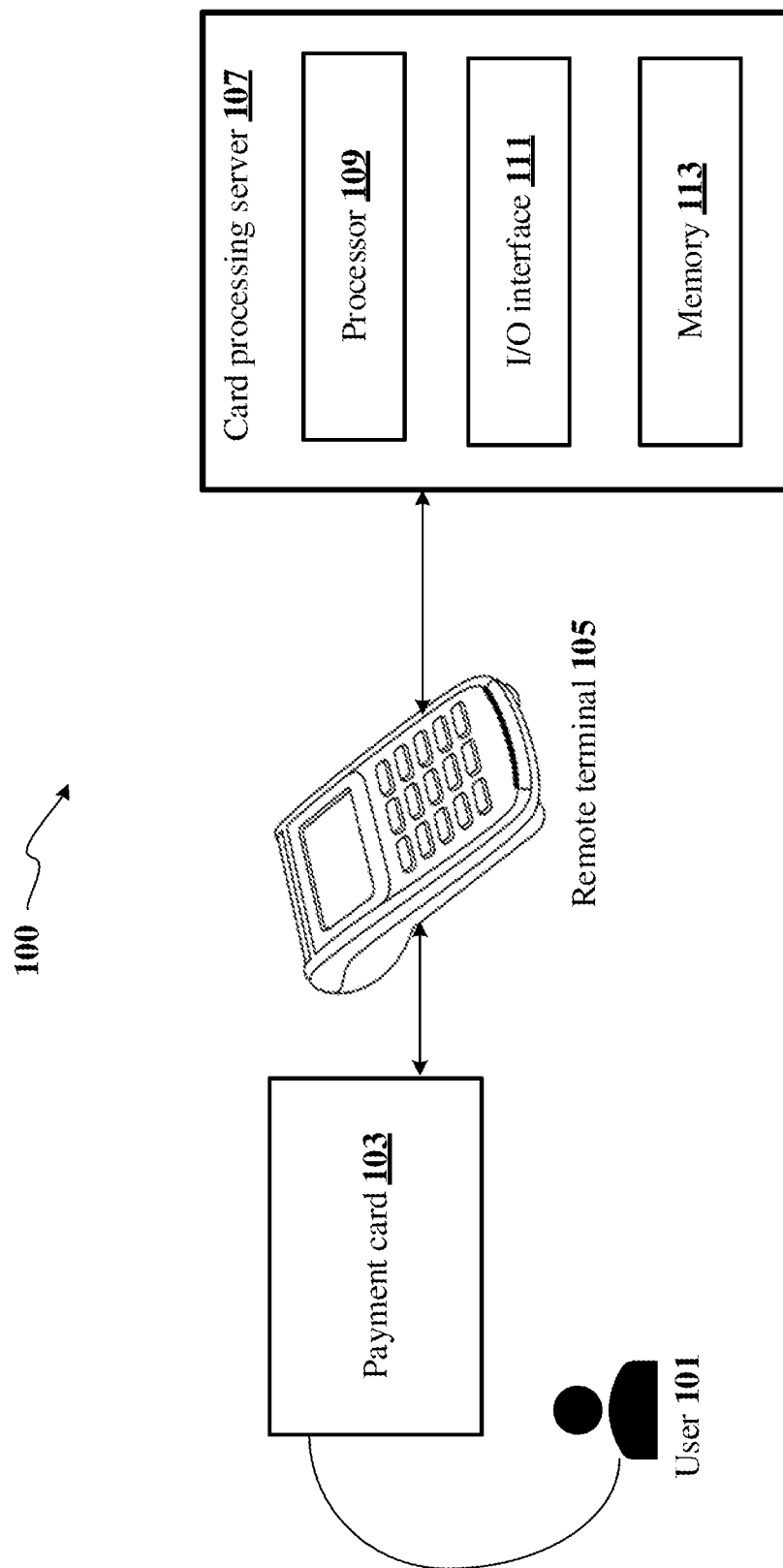
FIG. 1C shows an exemplary system for performing a restricted transaction, in accordance with some non-limiting embodiments or aspects of the present disclosure.

FIG. 1C shows an exemplary system 100 for performing a restricted transaction, in accordance with some non-limiting embodiments or aspects of the present disclosure. In some implementations, the system 100 may include a user 101, a payment card 103, a remote terminal 105, and a card processing server 107. In some non-limiting embodiments or aspects, the payment card 103 may be associated with a bank account of the user 101. As an example, the payment card 103 may be a credit card or a debit card. The payment card 103 may be communicatively interfaced with the remote terminal 105 to initiate a transaction. As an example, the payment card 103 may be interfaced by means of swiping, inserting, tapping, and the like. As an example, the remote terminal 105 may be a Point of Sale (PoS) device, such as a card accepting device that initiates a transaction.

When the payment card 103 is communicatively interfaced with the remote terminal 105, the remote terminal 105 may retrieve card details from the payment card 103. As an example, the card details may include, but are not limited to, a number of the payment card 103, name of cardholder, card verification value, expiration date of the payment card 103, issuer of the payment card 103, and the like. Similarly, the remote terminal 105 may also receive signature data from the payment card 103. As an example, the signature data may include, but is not limited to, at least one of a first signature and a second signature. In some non-limiting embodiments or aspects, a primary chip 125 configured in the payment card 103 may be associated with the first signature and a secondary chip 127 configured in the payment card 103 may be associated with the second signature. In some non-limiting embodiments or aspects, the remote terminal 105 may set a value of a flag based on availability of the second signature of the payment card 103. The value of the flag indicates one of two conditions to indicate an attachment or detachment of a first portion 121 and a second portion 123 of the payment card 103. In some non-limiting embodiments or aspects, when the remote terminal 105 receives the signature data from both the primary chip 125 and the secondary chip 127 of the payment card 103, e.g., when the signature data received by the remote terminal 105 includes both the first signature associated with the primary chip 125 and the second signature associated with the secondary chip 127, the remote terminal 105 may determine that the first portion 121 and the second portion 123 of the payment card 103 are in an attached state. Therefore, the remote terminal 105 may set the value of the flag to indicate a true condition since the payment card 103 is determined to be in the attached state. As an example, the true condition may be indicated by the value "1". However, when the remote terminal 105 receives the signature data from one of the primary chip 125 or the secondary chip 127 of the payment card 103, e.g., when the signature data received by the remote terminal 105 includes one of either the first signature or the second signature, the remote terminal 105 may determine that the first portion 121 and the second portion 123 of the payment card 103 are in a detached state. Therefore, the remote terminal 105 may set the value of the flag to indicate a false condition since the payment card 103 is determined to be in the detached state. As an example, the false condition may be indicated by the value "0". In some non-limiting embodiments or aspects, the signature data facilitates authentication of the secondary chip 127 with its corresponding primary chip 125. This avoids attempts of fraud using the second portion 123 of one payment card "A" with the first portion 121 of another payment card "B".

In some non-limiting embodiments or aspects, the remote terminal 105 may pass a signal to the primary chip 125 and the secondary chip 127 of the payment card 103. If the remote terminal 105 receives an acknowledgement from both the primary chip 125 and the secondary chip 127 upon passing the signal, then the remote terminal 105 may detect that the payment card 103 is in the attached state, or vice versa. In some non-limiting embodiments or aspects, the remote terminal 105 may determine the attached state and the detached state of the payment card 103 based on handshake signals between the primary chip 125 and the secondary chip 127. Based on the determination, the remote terminal 105 may then set the flag value to at least one of the true condition or the false condition. In some non-limiting embodiments or aspects, the handshake signal may determine whether the first portion 121 and the second portion 123 belong to the same payment card 103.

Further, the remote terminal 105 may transmit the card details, the signature data, the flag, and a transaction amount to the card processing server 107. The remote terminal 105 may be associated with the card processing server 107 via a communication network. In some non-limiting embodiments or aspects, the communication network may be at least one of a wired communication network and a wireless communication network.

Figure 2:
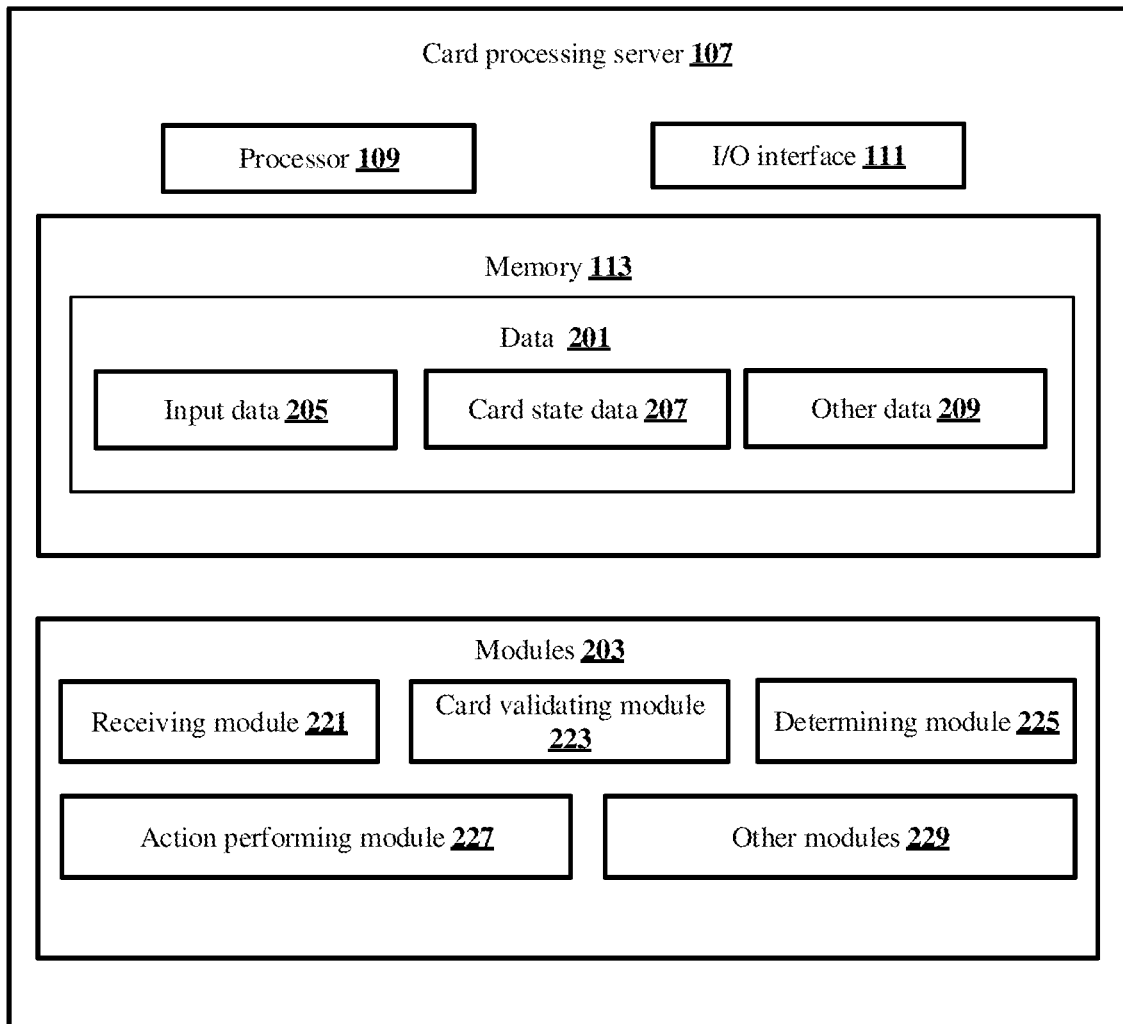
FIG. 2 shows a detailed block diagram of a card processing server for performing a restricted transaction, in accordance with some non-limiting embodiments or aspects of the present disclosure.

The card processing server 107 may include a processor 109, an Input/Output (I/O) interface 111 and a memory 113. The I/O interface 111 may enable receiving the card details, the transaction amount, the flag, and the signature data from the remote terminal 105 as input data. In some implementations, the card processing server 107 may include data 201 and modules 203 as shown in FIG. 2. As an example, the data 201 may be stored in the memory 113 as shown in FIG. 2. In some non-limiting embodiments or aspects, the data 201 may include input data 205, card state data 207, and other data 209. As shown in FIG. 2, modules 203 are described herein in detail. Further, it is to be understood that the term "module" is directed to applications, programming instructions, software, firmware, hardware, or other computer component capable of performing the desired functions/actions.

In some non-limiting embodiments or aspects, the data 201 may be stored in the memory 113 in the form of various data structures. Additionally, the data 201 can be organized using data models, such as relational or hierarchical data models. The other data 209 may store data, including temporary data and temporary files, generated by the modules 203 for performing the various functions of the card processing server 107.

In some non-limiting embodiments or aspects, the data 201 stored in the memory 113 may be processed by the modules 203 of the card processing server 107. The modules 203 may be stored within the memory 113. In an example, the modules 203 communicatively coupled to the processor 109 configured in the card processing server 107 may also be present outside the memory 113 as shown in FIG. 2 and implemented as hardware. As used herein, the term modules 203 may refer to an application specific integrated circuit (ASIC), an electronic circuit, a processor (shared, dedicated, or group), and memory that execute one or more software or firmware programs, a combinational logic circuit, and/or other suitable components that provide the described functionality.

In some non-limiting embodiments or aspects, the modules 203 may include, for example, a receiving module 221, a card validating module 223, a determining module 225, an action performing module 227, and other modules 229. The other modules 229 may be used to perform various miscellaneous functionalities of the card processing server 107. It will be appreciated that such aforementioned modules 203 may be represented as a single module or a combination of different modules.

In some non-limiting embodiments or aspects, the receiving module 221 may receive the input data 205 from the remote terminal 105. As an example, the input data 205 may include, but is not limited to, the card details, the transaction amount, the flag, and the signature data of a payment card 103. Additionally, in some non-limiting embodiments or aspects, the receiving module 221 may also receive an authentication pin related to the payment card 103 from the remote terminal 105.

In some non-limiting embodiments or aspects, the card validating module 223 may validate the payment card 103 based on the card details and the signature data of the payment card 103. Based on the card details, the card validating module 223 may initially perform first level of validation by checking whether the user 101 of the payment card 103 is a valid user based on the authentication pin. In some non-limiting embodiments or aspects, the card validating module 223 may check whether the payment card 103 is within the expiry date, based on the card details. Further, the card validating module 223 may analyze the signature data received from the remote terminal 105. In some non-limiting embodiments or aspects, the card validating module 223 may perform this validation using the signature data only when the signature data comprises both the first signature and the second signature of the payment card 103.

In some non-limiting embodiments or aspects, the card validating module 223 may detect the presence of both the first signature and the second signature by analyzing the signature data. In some other embodiments, the card validating module 223 may detect the presence of both the first signature and the second signature in the signature data based on the value of the flag. As an example, if the value of the flag indicates a true condition, e.g., if the value is "1", the card validating module 223 may infer the presence of both the first signature and the second signature in the signature data. Alternatively, if the value of the flag indicates a false condition, e.g., if the value is "0", the card validating module 223 may infer the presence of only one of the first signature or the second signature in the signature data.

If the signature data includes both the first signature and the second signature, the card processing server 107 may relate or compare the first signature associated with the primary chip 125 and the second signature associated with the secondary chip 127 to detect a match. In some non-limiting embodiments or aspects, relating the first signature and the second signature may help in validating whether the first portion 121 comprising the primary chip 125 is attached to its valid corresponding second portion 123 comprising the secondary chip 127 of the payment card 103. Generally, the signature data of a valid pair of the primary chip 125 and the secondary chip 127 is similar or pre-deterministic. Therefore, if the comparison results in a match, then the card validating module 223 may successfully validate the payment card 103 and proceed further. If the comparison fails to detect a match, the card validating module 223 may terminate or decline the transaction at this stage and send a transaction failure acknowledgement to the remote terminal 105.

Upon successful validation, the determining module 225 may determine a value associated with the flag received from the remote terminal 105. In some non-limiting embodiments or aspects, the value of the flag may determine one of two conditions, e.g., a true condition and a false condition. In some non-limiting embodiments or aspects, the determining module 225 may determine an attachment or a detachment of the first portion 121 of the payment card 103 and the second portion 123 of the payment card 103 based on the value associated with the flag received from the remote terminal 105. In some non-limiting embodiments or aspects, the determining module 225 may determine the attachment of the first portion 121 and the second portion 123 of the payment card 103, when the value associated with the flag indicates the true condition, e.g., when the value associated with the flag is set to "1". In some non-limiting embodiments or aspects, the determining module 225 may determine the detachment of the first portion 121 and the second portion 123 of the payment card 103, when the value associated with the flag indicates the false condition, e.g., when the value associated with the flag is set to "0". The determined state of attachment and detachment may be stored as card state data 207.

Upon determining the value associated with the flag, the action performing module 227 may determine the value associated with the flag received from the remote terminal 105. In some non-limiting embodiments or aspects, if the value associated with the flag indicates the true condition, e.g., if the value associated with the flag is "1", then the action performing module 227 may perform a first action. Alternatively, if the value associated with the flag indicates the false condition, e.g., if the value associated with the flag is "0", then the action performing module 227 may perform a second action. In some non-limiting embodiments or aspects, as part of the first action, the action performing module 227 may compare the transaction amount with a predefined transaction limit. The predefined transaction limit may be preconfigured by the user 101. If the transaction amount is determined to be less than a predefined transaction limit, the action performing module 227 may process the transaction. Upon processing the transaction, the action performing module 227 may transmit an acknowledgement to the remote terminal 105 to indicate a status "transaction complete" or "transaction processed". However, if the transaction amount is determined to be more than the predefined transaction limit, the action performing module 227 may decline the transaction. In some non-limiting embodiments or aspects, the first action ensures that the transaction is restricted, in real-time, if the condition preconfigured by the user 101 is not satisfied.

As an example, consider the following preconfigured condition.

Payment card 103 should be in the detached state;
Transaction limit: $300.

In the above exemplary scenario, the card processing server 107 should initially determine if the payment card 103 is the attached state or detached state during the transaction. The card processing server 107 may determine the attached state or the detached state based on the value of the flag. If the value of the flag is "1", the card processing server 107 may determine the payment card 103 to be in the attached state and if the value of the flag is "0", the card processing server 107 may determine the payment card 103 to be in the detached state. Consider the value of the flag is "0", the card processing server 107 may then proceed to compare the transaction amount with the transaction limit. As an example, consider the transaction amount is $400, which exceeds the predefined transaction limit of $300. Therefore, currently, the payment card 103 is determined to be in detached state but the transaction amount is determined to exceed the predefined transaction limit. In such a scenario, since the preconfigured condition of the user 101 is not satisfied, the card processing server 107 declines the transaction. On the other hand, if the transaction amount was less than the predefined transaction limit, for example, consider the transaction amount was $250. In such a scenario, and since the preconfigured condition of the user 101 is satisfied, the card processing server 107 processes the transaction.

In some non-limiting embodiments or aspects, as part of the second action, the action performing module 227 may process the transaction. The action performing module 227 may perform the second action only when the payment card 103 is in the attached state, e.g., when the value of the flag is "1". Therefore, since the attached state of the payment card 103 may not be associated with preconfigured transaction limit, the action performing module 227 directly processes the transaction, upon successful validation of the payment card 103.

The present disclosure is explained below with the help of exemplary scenarios. However, this should not be construed as a limitation of the present disclosure.

Exemplary Scenario 1

User 101: John is at a theatre and would like to use the payment card 103 to purchase movie tickets. Consider the predefined transaction limit set by John is $300. Since movie theatre is a public place and since the transaction amount to purchase the ticket is $50 which is within the preconfigured transaction limit, John may detach the second portion 123 of the payment card 103 and provide only the first portion 121 of the payment card 103 for initiating the transaction. Upon interfacing the first portion 121 of the payment card 103 with the remote terminal 105, the remote terminal 105 may receive the signature data, e.g., the first signature from the primary chip 125. Since, the remote terminal 105 receives only the first signature, the remote terminal 105 may determine that the first portion 121 and the second portion 123 of the payment card 103 are detached. Therefore, the remote terminal 105 may set the value of the flag as "0" to indicate the false condition. The remote terminal 105 may transmit the card details, the flag, and the signature data to the card processing server 107. The card processing server 107 may initially validate the payment card 103 based on the card details. Further, since the signature data received by the card processing server 107 comprises only the first signature, the card processing server 107 may not perform validation based on the signature data, which is to ensure that the first portion 121 and the second portion 123 of the payment card 103 that are attached during the transaction form a valid pair. Upon successful validation based on the card details, the card processing server 107 may compare the transaction amount with the predefined transaction limit and determines that the transaction amount to purchase the movie ticket is within the preconfigured transaction limit. Therefore, the card processing server 107 processes the transaction and sends an acknowledgement to the remote terminal 105. This scenario helps in eliminating chances of card skimming, e.g., when the first portion 121 of the payment card 103 is detached from the second portion 123, only partial details of the payment card 103 such as card number or a CVV number may appear on the first portion of the payment card 103, thereby eliminating chances of card skimming.

Exemplary Scenario 2

User 101: John has a son named Ross. Ross requires $900 for buying a guitar. However, John does not have cash with him currently. John does not wish to provide his payment card 103 to Jack, since he was afraid that Jack would overuse the funds associated with the payment card 103. Therefore, John sets a preconfigured transaction limit of $1,000 and provides only the first portion 121 of the payment card 103 to Jack. Jack goes to the guitar shop to purchase a guitar worth $900. However, Jack also felt like purchasing another instrument while he was in the shop, which was worth $500. The transaction amount totally was $1,400. Therefore, when Jack interfaces the first portion 121 of the payment card 103 with the remote terminal 105, the remote terminal 105 sets the flag to "0" to indicate the detached status of the payment card 103 and shares the card details, the transaction amount, the flag, and the signature data to the card processing server 107. The card processing server 107 upon successful validation based on the card details, compares the transaction amount with the predefined transaction limit and determines that the transaction amount to purchase the guitar and another instrument exceeds the preconfigured transaction limit set by John. Therefore, the card processing server 107 declines the transaction and sends a corresponding acknowledgement to the remote terminal 105. This scenario helps in eliminating misuse/overuse of the funds in the payment card 103 by restricting the transaction amount while handing over the first portion 121 of the payment card 103 to children or a family member or a friend.

Exemplary Scenario 3

User 101: John lost the first portion 121 of the payment card 103 at a supermarket and a person "X" found the first portion 121. Consider Person "X" tries to take advantage of the situation and attempts to purchase a product costing $4,000. Since, John had set a preconfigured transaction limit, e.g., $1,000 when only the first portion 121 of the payment card 103 is used for transaction, person "X" fails to pay the amount of $4,000 in spite of multiple trials. Therefore, person "X" attaches a second portion of a different payment card and attempts to initiate the transaction yet again. When the first portion 121 of the payment card 103 is attached with the second portion of a different payment card, the remote terminal 105 may set the flag to "1" to indicate the attached state of the payment card 103. However, the card processing server 107 may validate the payment card 103 based on the signature data. When the card processing server 107 compares the first signature of the primary chip 125 configured in the first portion 121 of the payment card 103 with a second signature of a secondary chip configured in the second portion of a different payment card, the first signature and the second signature may not match. Therefore, the card processing server 107 infers that the first portion 121 of the payment card 103 is attached to a second portion of a different payment card, which is not a valid pair, and thereby declines the transaction. This scenario helps in eliminating fraudulent transactions and ensures enhanced security during card present transactions.

Figure 3:
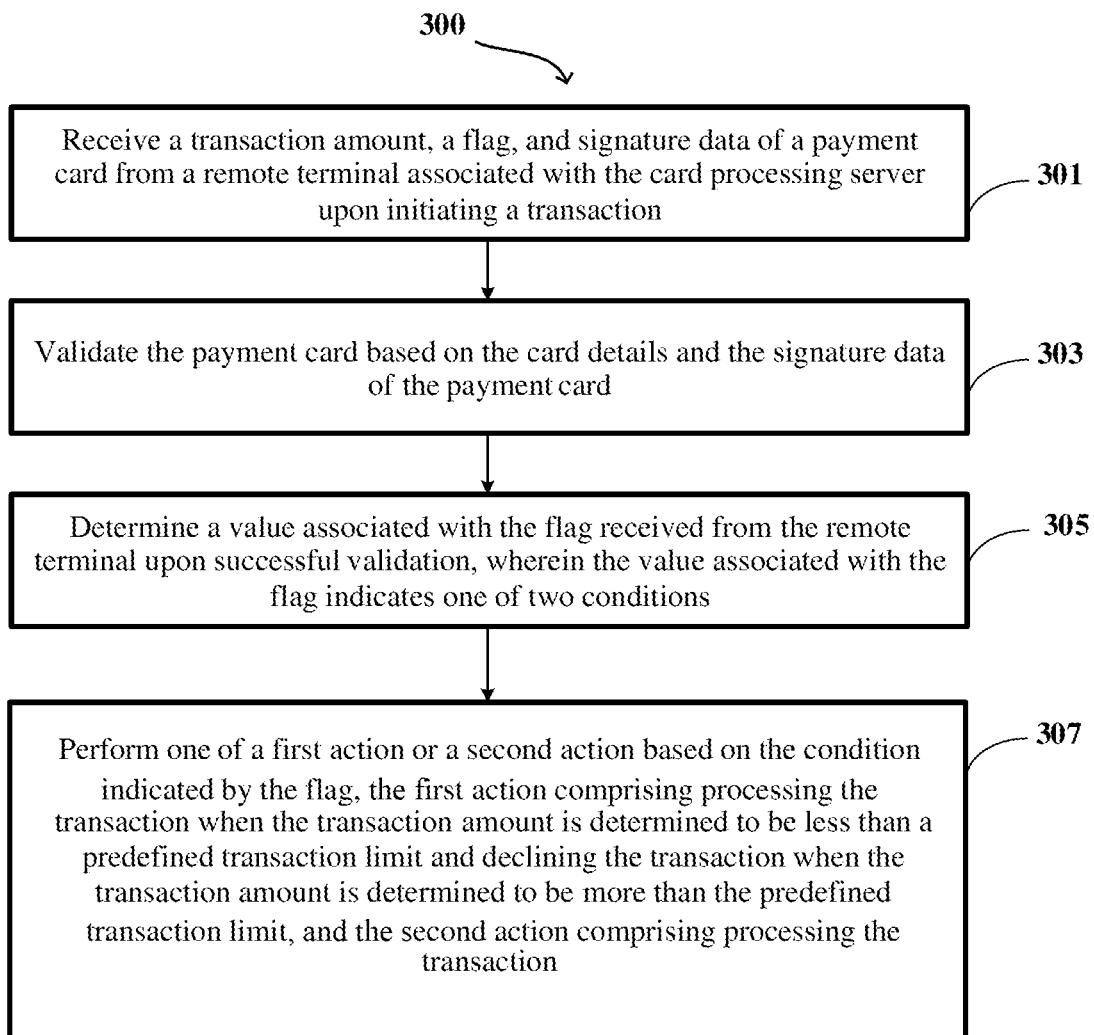
FIG. 3 shows a flow chart illustrating method steps for performing a restricted transaction, in accordance with some non-limiting embodiments or aspects of the present disclosure.

FIG. 3 shows a flow chart illustrating a method 300 of performing a restricted transaction, in accordance with some non-limiting embodiments or aspects of the present disclosure. The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of a card processing server 107, input data 205 from a remote terminal 105 associated with the card processing server 107. In some non-limiting embodiments or aspects, the input data 205 may include, but is not limited to, card details, a transaction amount, a flag and signature data of a payment card 103. At block 303, the method 300 may include validating, by the processor 109, the payment card based on the card details and the signature data of the payment card 103. In some non-limiting embodiments or aspects, validating the payment card comprises relating a first signature associated with a primary chip 125 of the payment card 103 and a second signature associated with a secondary chip 127 of the payment card 103 to detect a match.

At block 305, the method 300 may include determining, by the processor 109, a value associated with the flag received from the remote terminal 105 upon successful validation. In some non-limiting embodiments or aspects, the value associated with the flag indicates one of two conditions. As an example, the two conditions may be either a true condition or a false condition. The value of the flag may be set to indicate the true condition when signature data received at the remote terminal 105 comprises the first signature and the second signature. In other words, the value of the flag may be set to indicate the true condition when a first portion 121 of the payment card 103 and a second portion 123 of the payment card 103 are attached. Similarly, the value of the flag may be set to indicate the false condition when signature data received at the remote terminal 105 comprises one of the first signature or the second signature. In other words, the value of the flag may be set to indicate the false condition when the first portion 121 of the payment card 103 and the second portion 123 of the payment card 103 are detached.

At block 307, the method 300 may include performing, by the processor 109, one of a first action or a second action based on the condition indicated by the flag, e.g., the true condition or the false condition. In some non-limiting embodiments or aspects, the first action may include processing the transaction when the transaction amount is determined to be less than a predefined transaction limit and declining the transaction when the transaction amount is determined to be more than the predefined transaction limit. In another example, the first action may include restricting a transaction related to certain products by pre-configuring a corresponding Merchant Category Code (MCC). In such scenarios, the transaction may be declined when a purchase is related to a product belonging to a particular MCC. In some non-limiting embodiments or aspects, the second action may include processing the transaction.

The present disclosure provides a payment card 103 having a first portion and a second portion that are communicatively connected through a physical communication link 131 and physically connected through a mechanism 129. As an example, the physical communication link 131 may be an electronic circuit and the mechanism 129 may be a magnetic link. Accordingly, the present disclosure enables a user 101 of the payment card 103 to restrict the transaction as per his requirement in real-time, by allowing the user 101 to set a transaction limit while using only the first portion 121 of the payment card 103. Therefore, the user 101 can use a single payment card 103 for performing both restricted and non-restricted transactions.

The present disclosure enables the remote terminal to share an additional parameter to the card processing server 107, e.g., the flag, by detecting the attachment or detachment of the first portion 121 and the second portion 123 of the payment card 103 based on the signature data received from the primary chip 125 and the secondary chip 127. Based on the value associated with the flag, the card processing server 107 decides whether the transaction has to be restricted or not.

The present disclosure eliminates the possibility of card skimming when the payment card 103 is provided for performing transactions. When the user 101 provides only the first portion 121 of the payment card 103 to perform the transaction, details of the payment card 103 such as CVV, card number, and the like may not be present or may be partially present on the first portion 121 of the payment card 103, thus securing the details of the payment card 103.

The present disclosure eliminates the possibility of performing a fraudulent transaction by attaching a first portion 121 of the payment card 103 with a second portion of a different payment card, or vice versa, in order to avoid the transaction limit set by the user 101. Therefore, even when a third party or a fraudulent user gets hold of the first portion 121 of the payment card 103 of the user 101, he may not be able to initiate a fraudulent transaction for a large amount, since the valid second portion 123 of the payment card 103 is not available.

Figure 4:
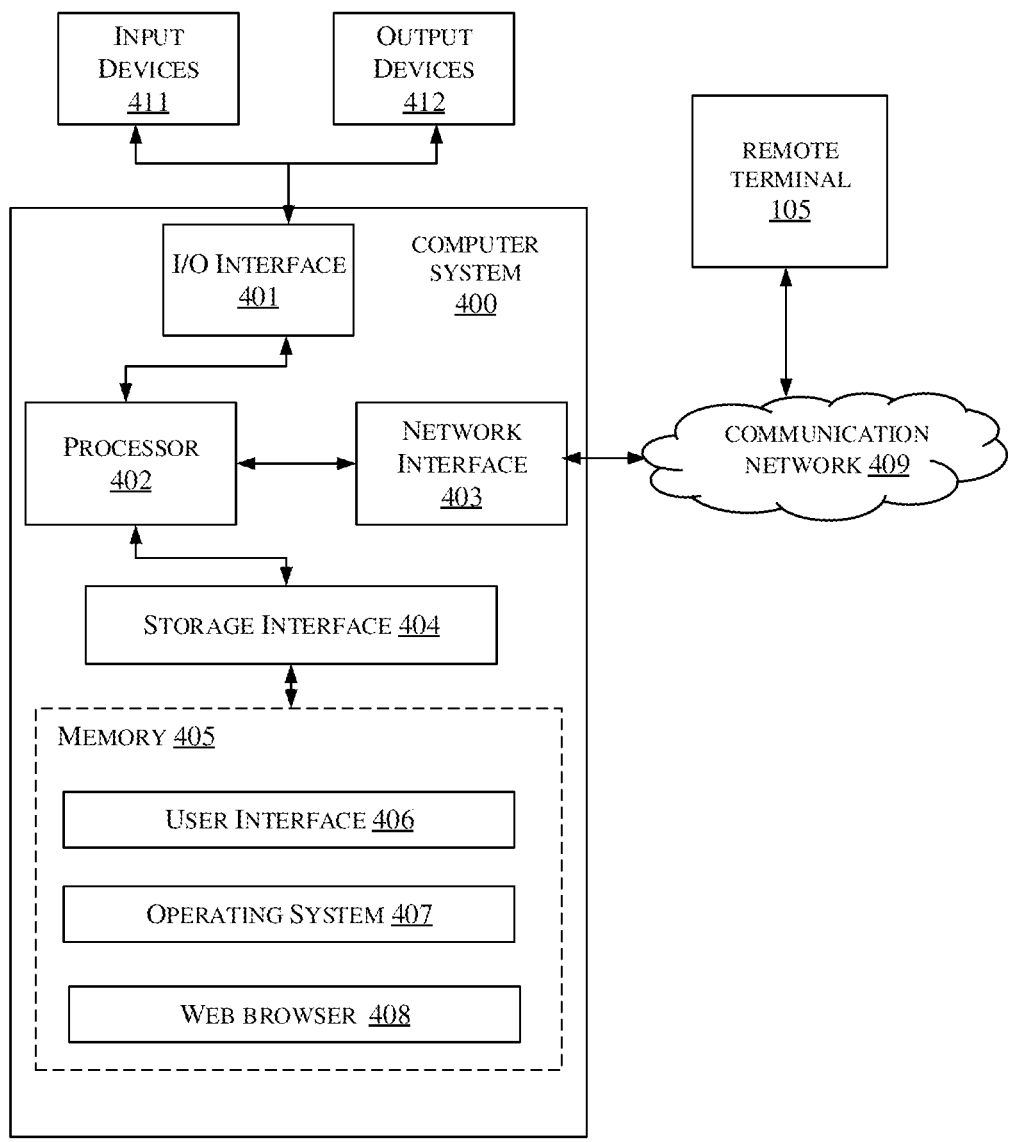
FIG. 4 is a block diagram of an exemplary computer system for implementing embodiments consistent with the present disclosure.

FIG. 4 is a block diagram of an exemplary computer system for implementing embodiments consistent with the present disclosure. In some non-limiting embodiments or aspects, FIG. 4 illustrates a block diagram of an exemplary computer system 400 for implementing embodiments consistent with the present disclosure. In some non-limiting embodiments or aspects, the computer system 400 can be a card processing server 107 that is used for restricting a transaction in real-time. The computer system 400 may include a central processing unit ("CPU" or "processor") 402. The processor 402 may include at least one data processor for executing program components for executing user or system-generated business processes. A user may include a person, a person using a device such as those included in this disclosure, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via an I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 401, the computer system 400 may communicate with the input devices 411 and the output devices 412.

In some non-limiting embodiments or aspects, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a remote terminal 105. In some non-limiting embodiments or aspects, the computer system 400 is capable of communicating with a plurality of remote terminals parallelly. The communication network 409 can be implemented as one of the different types of networks, such as intranet or Local Area Network (LAN), Closed Area Network (CAN), and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some non-limiting embodiments or aspects, the processor 402 may be disposed in communication with a memory 405 (e.g., RAM, ROM, etc. not shown in FIG. 4) via a storage interface 404. The storage interface 404 may connect to the memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408, etc. In some non-limiting embodiments or aspects, the computer system 400 may store user/application data, such as the data, variables, records, etc. as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The user interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some non-limiting embodiments or aspects, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some non-limiting embodiments or aspects, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some non-limiting embodiments or aspects, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some non-limiting embodiments or aspects", and "one embodiment" mean "one or more (but not all) embodiments of the invention(s)" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A payment card comprising:
a first portion with a primary chip;
a second portion with a secondary chip;
a mechanism capable of detachably connecting the first portion and the second portion; and
a physical communication link configured between the primary chip and the secondary chip to communicatively connect the first portion and the second portion of the payment card, wherein the physical communication link facilitates a determination of whether the first portion is physically intact with the second portion, wherein the second portion includes card details of the payment card, and wherein the first portion one of: (i) includes only a partial portion of the card details and (ii) does not include the card details,
wherein the second portion is pre-configured with a transaction amount limit when the second portion is determined to be detached from the first portion during a transaction.

2. The payment card of claim 1, wherein the card details include at least one of: a card number, a Card Verification Value (CVV), an expiry date, a name, or any combination thereof.

3. The payment card of claim 2, wherein the card details include the card number, wherein the first portion includes a partial portion of the card number, and wherein the second portion includes the remaining portion of the card number.

4. The payment card of claim 2, wherein the card details include the CVV, wherein the second portion includes the CVV, and wherein the first portion does not include the CVV.

5. The payment card of claim 2, wherein the card details include each of: the card number, the CVV, the expiry date, and the name.

6. The payment card of claim 1, wherein the primary chip is associated with a first signature and the secondary chip is associated with a second signature.

7. The payment card of claim 6, wherein the first signature and the second signature facilitate authentication of the first portion and the second portion of the payment card when the first portion and the second portion are physically intact.

8. The payment card of claim 1, wherein the physical communication link is further configured to transmit signature data from the primary chip and the secondary chip to a remote terminal when the payment card is interfaced with the remote terminal, and wherein the signature data comprises at least one of a first signature and a second signature.

9. The payment card of claim 1, wherein the mechanism is a magnetic link.

10. A system comprising:
a payment card including a first portion with a primary chip, a second portion with a secondary chip, and a mechanism capable of detachably connecting the first portion and the second portion, wherein the second portion includes card details of the payment card, and wherein the first portion one of: (i) includes only a partial portion of the card details and (ii) does not include the card details;
a remote terminal; and
a card processing server,
wherein the remote terminal is configured to:
retrieve card details from the payment card communicatively interfaced with the remote terminal;
receive signature data from at least one of a primary chip of the payment card and a secondary chip of the payment card;
set a value of a flag to indicate a true condition, when the signature data is received from the primary chip and the secondary chip, or a value of the flag to indicate a false condition, when the signature data is received from one of the primary chip or the secondary chip;
transmit the card details, the signature data, the flag, and a transaction amount to the card processing server associated with the remote terminal for initiating a transaction; and receive an acknowledgement related to at least one of completion of the transaction or denial of the transaction from the card processing server, and wherein the card processing server is configured to:
  receive the card details, the transaction amount, the flag, and the signature data of the payment card from the remote terminal;
  validate the payment card based on the card details and the signature data of the payment card;
  determine the value associated with the flag received from the remote terminal upon successful validation, wherein the value associated with the flag indicates one of two conditions; and
  perform one of a first action and a second action based on the condition indicated by the flag, wherein the first action comprises: processing the transaction when the transaction amount is determined to be less than a predefined transaction limit; and declining the transaction when the transaction amount is determined to be more than the predefined transaction limit, and wherein the second action comprises processing the transaction.

11. The system of claim 10, wherein the card details include at least one of: a card number, a Card Verification Value (CVV), an expiry date, a name, or any combination thereof.

12. The system of claim 11, wherein the card details include the card number, wherein the first portion includes a partial portion of the card number, and wherein the second portion includes the remaining portion of the card number.

13. The system of claim 11, wherein the card details include the CVV, wherein the second portion includes the CVV, and wherein the first portion does not include the CVV.

14. The system of claim 11, wherein the card details include each of: the card number, the CVV, the expiry date, and the name.

15. The system of claim 11, wherein the primary chip is configured in a first portion of the payment card and the secondary chip is configured in a second portion of the payment card, and wherein the first portion of the payment card and the second portion of the payment card form a unique pair that are detachable and communicatively connectable.

16. The system of claim 15, wherein the first portion of the payment card comprising the primary chip is communicatively interfaced with a remote terminal for initiating a transaction, and wherein the first portion of the payment card is attached or detached from the second portion of the payment card while initiating the transaction.

17. The system of claim 11, wherein the signature data comprises at least one of a first signature associated with the primary chip and a second signature associated with the secondary chip.

18. The system of claim 11, wherein the card processing server validates the payment card by relating a first signature associated with the primary chip and a second signature associated with the secondary chip to detect a match.

19. The system of claim 11, wherein the card processing server is further configured to detect an attachment or a detachment of a first portion of the payment card and a second portion of the payment card based on the value associated with the flag, wherein the card processing server determines the attachment when the value associated with the flag indicates a true condition, and wherein the card processing server determines the detachment when the value associated with the flag indicates a false condition.

* * * * *